United States Patent
Ganev et al.

(10) Patent No.: US 9,077,237 B2
(45) Date of Patent: Jul. 7, 2015

(54) COMPOSITE AC-TO-DC POWER CONVERTER WITH BOOSTING CAPABILITIES

(71) Applicant: HONEYWELL INTERNATIONAL, INC., PATENT SERVICES M/S AB/2B, Morristown, NJ (US)

(72) Inventors: Evgeni Ganev, Torrance, CA (US);
William Warr, Glendale, CA (US);
Keming Chen, Torrance, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 279 days.

(21) Appl. No.: 13/665,842

(22) Filed: Oct. 31, 2012

(65) Prior Publication Data

US 2014/0119073 A1    May 1, 2014

(51) Int. Cl.
*H02M 7/02*     (2006.01)
*H01F 30/02*    (2006.01)
*H01F 30/14*    (2006.01)
*H02M 7/08*     (2006.01)

(52) U.S. Cl.
CPC ............... *H02M 7/02* (2013.01); *H01F 30/02* (2013.01); *H01F 30/14* (2013.01); *H02M 7/08* (2013.01)

(58) Field of Classification Search
CPC ......... H01F 21/02; H01F 30/02; H01F 30/14; H02M 5/42; H02M 5/14; H02M 7/08
USPC ........... 323/208; 303/212, 216, 217; 363/126, 363/154, 131
See application file for complete search history.

(56) References Cited

U.S. PATENT DOCUMENTS

| | | | | |
|---|---|---|---|---|
| 5,093,583 | A | * | 3/1992 | Mashino et al. ............. 307/10.1 |
| 5,982,262 | A | * | 11/1999 | Levin ................................ 336/5 |
| 6,198,647 | B1 | * | 3/2001 | Zhou et al. ..................... 363/154 |
| 6,650,557 | B2 | | 11/2003 | Ferens et al. |
| 7,474,188 | B2 | | 1/2009 | Bruzy et al. |
| 2007/0258275 | A1 | * | 11/2007 | Brochu et al. .................. 363/64 |
| 2011/0051480 | A1 | * | 3/2011 | Blanchery ..................... 363/154 |
| 2013/0170257 | A1 | | 7/2013 | Ganev et al. |

FOREIGN PATENT DOCUMENTS

EP    1821398 A1    8/2007
EP    2337197 A1    6/2011

OTHER PUBLICATIONS

European Search Report in EP Application No. EP13187195.6 dated Jan. 27, 2014.

(Continued)

*Primary Examiner* — Harry Behm
*Assistant Examiner* — Peter Novak
(74) *Attorney, Agent, or Firm* — Shimokaji IP

(57) ABSTRACT

A nearly 2 to 1 boosting mufti-phase AC-to-DC converter may include a main rectifier, an auxiliary rectifier; and an autotransformer connected to the main rectifier and the auxiliary rectifier. The autotransformer may include a plurality of interconnected windings arranged in a plurality of legs, with one of the legs for each phase and with each leg including a plurality of windings, wherein all but one of the windings of each leg have equal turns ratios and one of the windings of each leg has a turns ratio that is less than the turns ratio of all of the other windings of the respective leg.

10 Claims, 4 Drawing Sheets

(56) References Cited

OTHER PUBLICATIONS

A Compact Autotransformer Based 12-pulse Rectifier Circuit, Kamath, Girish, et al., IECON Proceedings (Industrial Electronics Conference), Nov. 29, 2001.

Application of Pulse Doubling in Star-Connected Autotransformer Based 12-pulse AC-DC Converter for Power Quality Improvement, Abdollahi, Rohollah, World Academy of Science, Engineering and Technology, Aug. 2011.

Asymmetrical Multi-Phase Voltage Methods of Autotransformer-Based Boost Rectifier Systems with Three-phase Sinusoidal Line Currents, Oguchi, K., 2008 International Symposium on Power Electronics, Electrical Drives, Automation and Motion (SPEEDAM), Jun. 11, 2008.

Modeling, Simulation and Validation of a Twelve-pulse Autotransformer Rectifier for Aerospace Applications, Cross, A. M., et al., Second IEE International Conference on Power Electronics, Machines, and Drives (Conference Publication No. 498), Mar. 31, 2004.

Closed-loop Sinusoidal Input-current Shaping of 12-pulse Autotransformer Rectifier Unit with Impressed Output Voltage, Biela, Juergen, et al., IEEE Transations on Power Electronics, 2006.

* cited by examiner

US 9,077,237 B2

COMPOSITE AC-TO-DC POWER CONVERTER WITH BOOSTING CAPABILITIES

BACKGROUND OF THE INVENTION

The present invention generally relates to AC-to-DC converters and more particularly to passive AC-to-DC converters with voltage boosting capability.

AC-to-DC converters play a significant role in the modern aerospace/military industry. This is particularly true in the area of more electric architecture (MEA) for aircraft and spacecraft. Power quality is a major concern for MEA aircraft because of the large number of electric power systems and equipment installed on the same bus. The power quality of these systems and equipment has stringent requirements to ensure that all power supplies/utilization equipment function together properly.

The term "composite AC-to-DC converter" has been coined to distinguish a converter using two or more conversion methods in parallel. The concept for a composite AC-to-DC converter originated as a further improvement towards smaller size, lower weight, and higher efficiency.

While composite AC-to-DC converters present a large step toward performance improvement they have not incorporated efficient boosting capabilities. They typically provide rectification of a three phase 115-Vac system resulting in a typical output voltage value of 270 Vdc. There are many applications where the output voltage is desired to be much higher for a better performance of a consecutive power conditioning. Typical values used in some power distribution systems are 540 Vdc, +/−270 Vdc and 610 Vdc. That means that it would be desirable for a composite AC-to-DC converter, used in a three phase 115-Vac system, to produce output voltage about two times higher at its rectified output. In other words, it would be desirable to provide voltage boosting capability in a composite AC-to-DC converter. Additionally, it would be desirable to achieve such voltage boosting passively, employing an autotransformer, as compared to an active semiconductor-based boosting circuit. In the context of aerospace applications inherent reliability of a passive system as compared to an active system is an important consideration.

Within an autotransformer of a composite AC-to-DC converter, interior winding turn ratios are responsible for its voltage boost factor. However a typical autotransformer's conversion ratio (ACR) will begin to decrease when used for voltage boosting. The main cause of a decreasing ACR in a boost topology can be viewed as the autotransformer winding volts*amperes (VA) sum is going up while the autotransformer output power is remaining constant. A high ACR is desirable in an autotransformer used in an aerospace vehicle because such an autotransformer may be constructed with smaller windings and with less weight than an autotransformer having a low ACR.

As can be seen, there is a need for a passive composite AC-to-DC converter with voltage boosting capability. More particularly, there is a need for such a converter that may produce voltage boosting passively with an autotransformer which may operate with a high ACR.

SUMMARY OF THE INVENTION

In one aspect of the present invention, a multi-phase AC-to-DC converter may comprise: a main rectifier; an auxiliary rectifier; and an autotransformer connected to the main rectifier and the auxiliary rectifier, an autotransformer connected to the main rectifier and the auxiliary rectifier, the autotransformer including a plurality of interconnected windings arranged in a plurality of legs with one of the legs for each phase and with each leg including a plurality of windings, wherein all but one of the windings of each leg have equal turns ratios and one of the windings of each leg has a turns ratio that is less than the turns ratio of all of the other windings of the respective leg.

In another aspect of the present invention, a three phase voltage-boosting autotransformer with windings arranged in three legs may comprise: windings with turns ratios determined in accordance with a vector diagram constructed using line-to-line voltage vectors connecting tips positioned on projections of sides of an equilateral triangle; wherein a constructor arc is swung between the tips with a radius equal to a length of the line-to-line voltage vector; and wherein the length of the line-to-line voltage vector is selected so that are a resultant number of four of the windings in each of the legs of the autotransformer.

In still another aspect of the invention, a method for performing three phase AC-to-DC power conversion with a voltage boost may comprise the steps of: passing a first portion AC power through phase-dedicated windings of an autotransformer directly to a main rectifier with the voltage of the first portion boosted; passing a second portion of AC power through a plurality of windings of the autotransformer, other than the phase-dedicated windings, to an auxiliary rectifier with voltage of second portion boosted; rectifying the first and second portions using the main and the auxiliary rectifiers respectively; and combining outputs of the main and auxiliary rectifiers to produce a single rectified boosted DC voltage output.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a passive composite AC-to-DC converters with voltage boosting capability. More particularly, such converters may produce voltage boosting passively with an autotransformer that operates with a high ACR.

Figure 1:
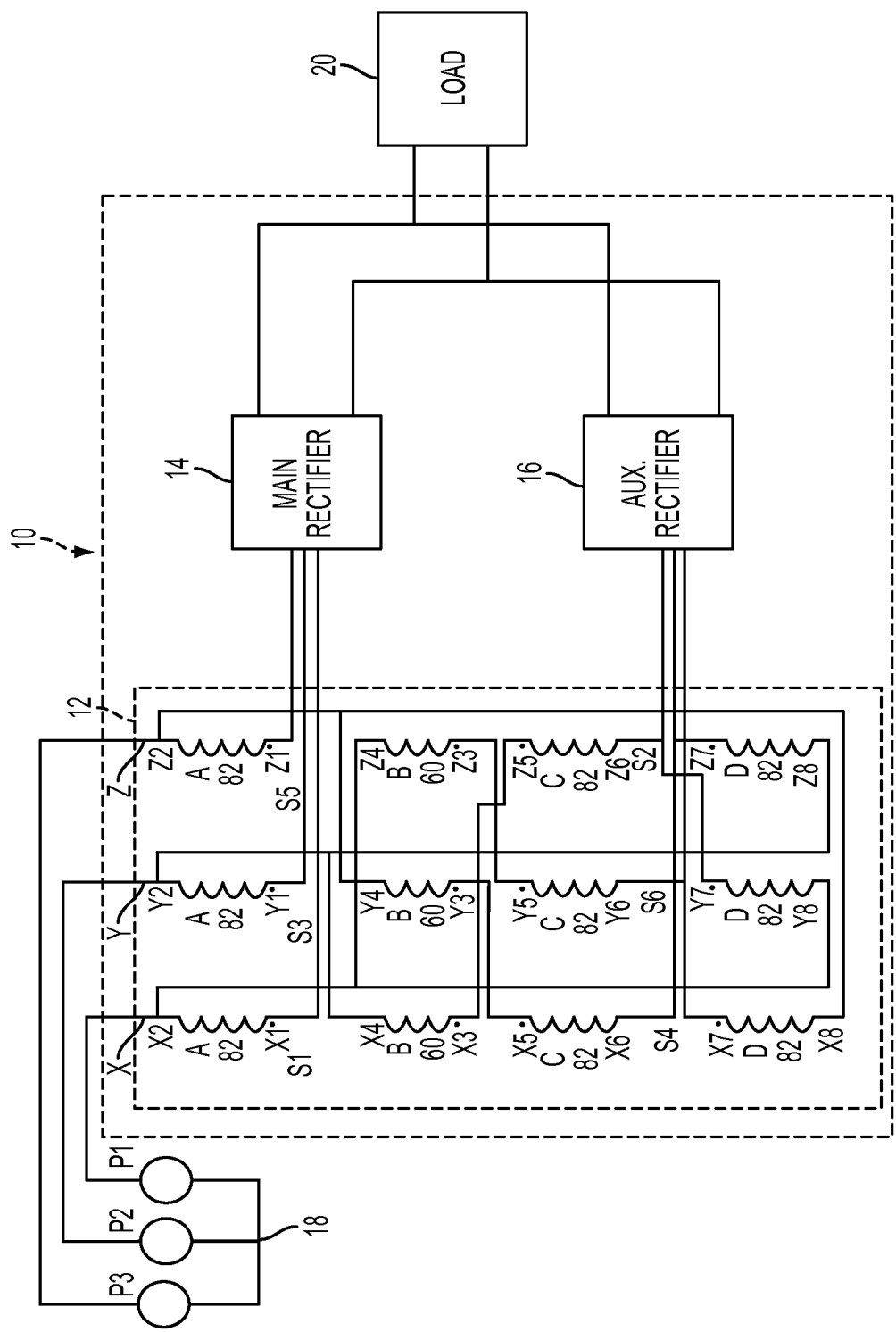
FIG. 1 is a schematic diagram of an AC-to-DC power converter in accordance with an embodiment of the invention.

Referring now to FIG. 1, it may be seen that an exemplary AC-to-DC converter 10 may include an autotransformer 12, a main rectifier 14 and an auxiliary rectifier 16, In FIG. 1 the converter 10 is shown interconnected between a 3-phase power supply 18 and a DC load 20. The main rectifier 14 and the auxiliary rectifier 16 may be conventional 6 pulse rectifiers. The autotransformer 12 may be constructed with three legs X, Y and Z. Each of the legs X, Y and Z may include four windings A, B, C and D. The twelve windings of the autotransformer 12 may be interconnected among one another and between the power supply 18 and the rectifiers 14 and 16 as shown in FIG. 1.

Turn ratios of the windings and their interconnection arrangement may be selected to provide for both a high voltage boost and a high autotransformer conversion ratio (ACR).

Figure 2:
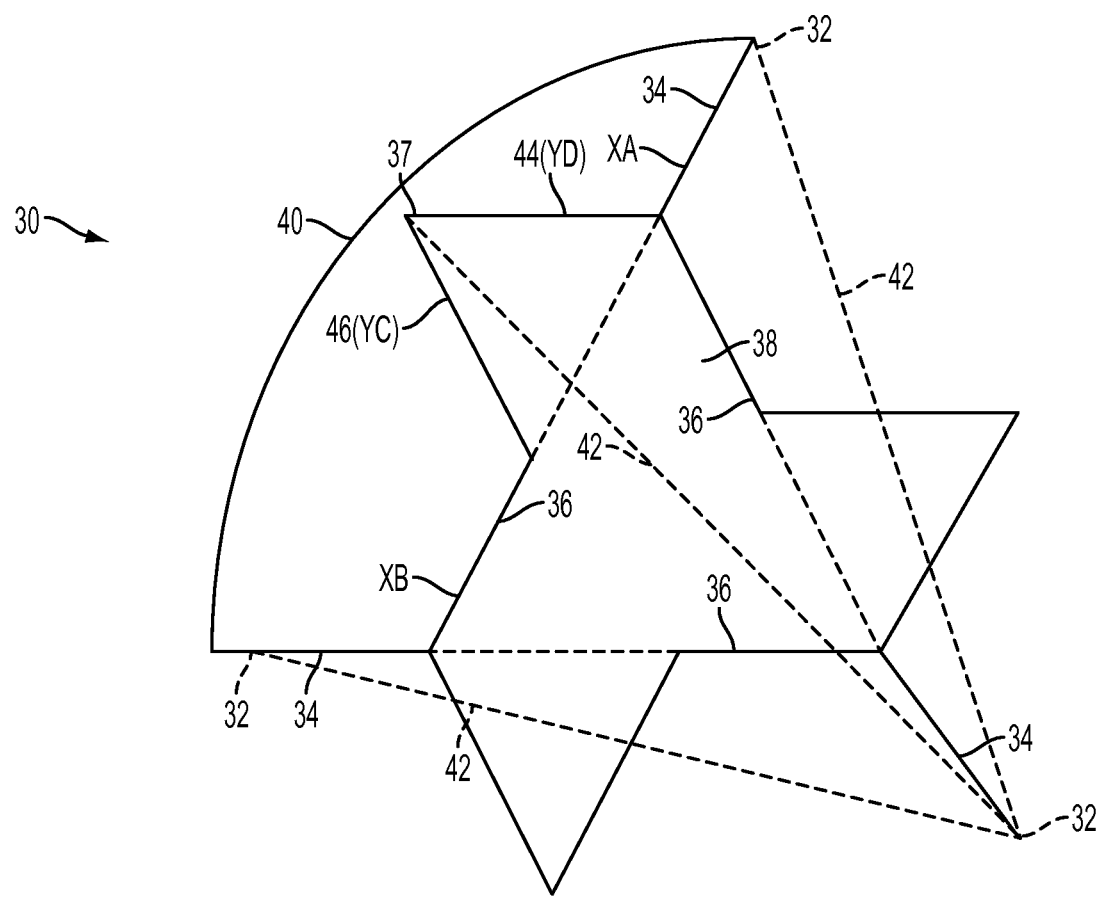
FIG. 2 is a vector diagram of an analytical technique employed to determine a winding configuration of an auto transformer in accordance with an embodiment of the invention.

Referring now to FIG. 2, a vector diagram 30 displays an analytical technique that may be employed to determine turn ratios and an interconnection configuration for the windings of the autotransformer 12. The vector diagram 30 may be constructed using line-to-line voltage vectors 42 connecting tips 32 positioned on projections 34 along sides 36 of an equilateral triangle 38. A constructor arc 40 is swung between these tips 32 equal to a length of the line-to-line voltage span vector 42. The length of the vector 42 is selected so that there are a resultant number of four of the windings A, B, C and D in each of the legs X, Y and Z (See FIG. 1). Four is a minimum number of windings per leg that may work effectively in a voltage boosting 12 pulse rectification system. When only four winding are used in each leg, the overall weight and size of the autotransformer 12 may be minimized One of the vectors 42 that is angularly equally spaced from the other vectors 42 may be drawn from an opposite one of the vector tips 32 to midpoint of 37 the arc 40. The tips 32 or Intersection points of the vectors 42 with the arc 40 may then be used are used to design the voltage ratios and interconnections of the windings. For example, a vector 44 for winding YD may be drawn between the midpoint 37 of the arc 40 and a left side of the triangle 38 in a direction parallel to a bottom side of the triangle. A vector 46 for winding ZC may be drawn from the midpoint 37 to the left side of the triangle in a direction parallel to a right side of the triangle 38.

The analytical process described above may be repeated for all three phases of the power input 18 so that turns ratios for all of the twelve windings of the autotransformer 12 may be determined.

For, example, on the diagram 30, the sides of the triangle may be normalized to a value of 1. The length of the vector 42 may correspond to desired voltage boost and may be selected with a value of about 2. The resultant turns ratios for windings XA, YD and ZC may be about 0.57. The resultant turns ratio for the winding XB may be about 0.42. It may be seen that as the above described process is repeated for all three phases, a resultant pattern of turns ratios for each of the legs X, Y and Z may comprise three windings with equal turns ratios and a fourth winding with a turns ratio being between about 70% and 75% (e.g., 0.42/0.57) of the turns ratios of any of the other three windings of the leg.

Figure 3:
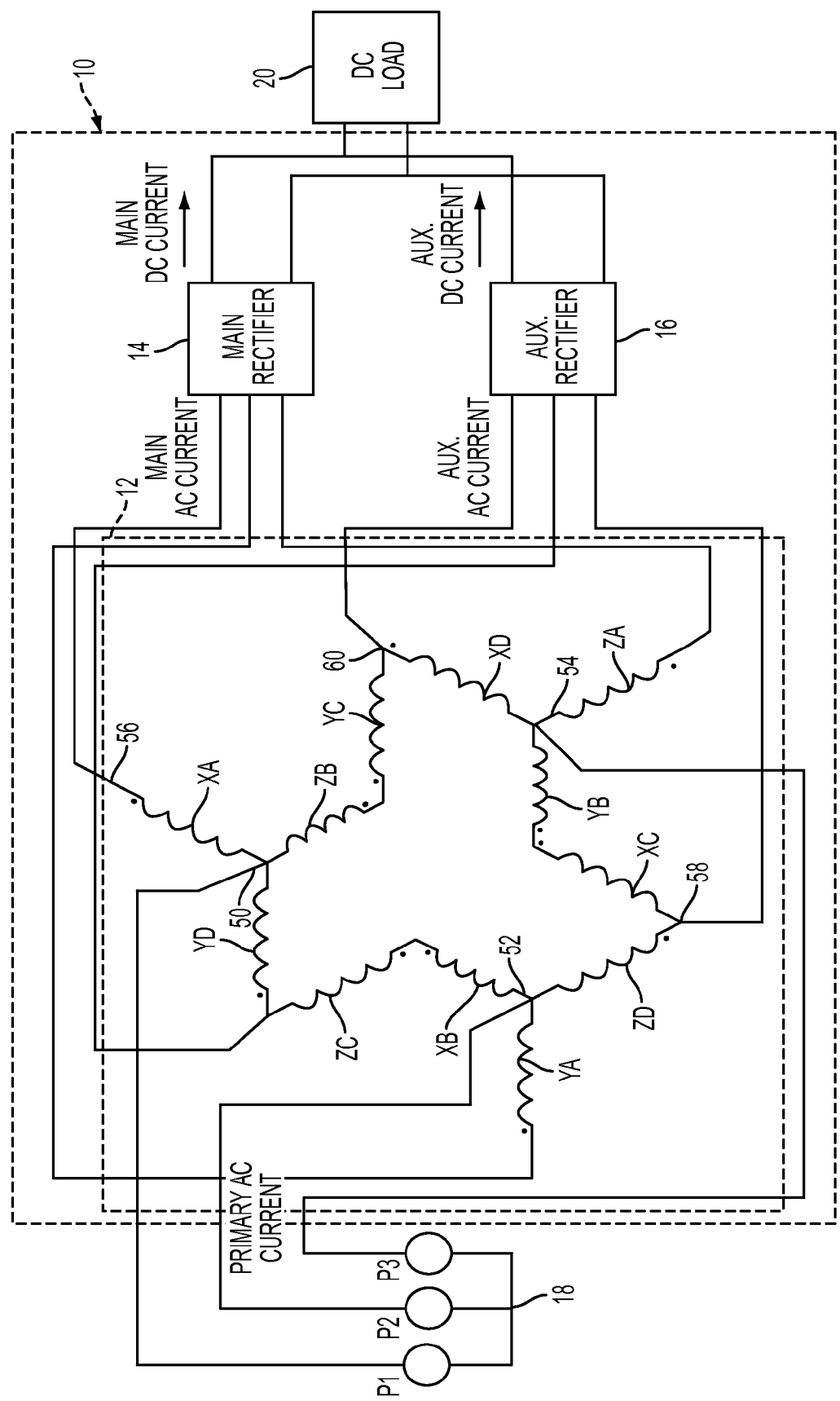
FIG. 3 is a graphical illustration of a simplified schematic diagram of the converter of FIG. 1 reflecting an autotransformer configuration in vector format.

Referring now to FIG. 3, it may be seen that the autotransformer 12 and the interconnections of FIG. 1 may graphically displayed in an alternative simplified schematic format that may reflect the outcome of the vector analysis shown in FIG. 2. An AC input from phase P1 may be connected at power input terminal 50, an electrical intersection of windings XA, YD and ZB. An AC input from phase P2 may be connected at power input terminal 52, an electrical intersection of windings YA, ZD and XB. An AC input from phase P3 may be connected at terminal 54, an electrical intersection of windings ZA, YB and XD. The windings XA, YA and ZA may be directly connected to inputs of the main rectifier 14 at output terminals 56, 58 and 60 respectively. In this regard, the windings XA, YA and ZA may be considered to be phase-dedicated windings. The windings YD, ZC and XD may be connected to one another between the terminals 50 and 52. The windings ZD, XC and YB may be connected to one another between the terminals 52 and 54. The windings XD, YC and ZB may be connected to one another between the terminals 54 and 50.

It may be seen that the portion of current fed to auxiliary rectifier 16 is less than the portion fed to the main rectifier 14 and the portion of current to the main rectifier 16 follows a low impedance path. The significance of this split is that the autotransformer 12 may have less losses if the larger current portion takes a "short" path within the autotransformer 12 to its output. As a consequence of the configuration of windings in the autotransformer 12, the converter 10 may be provided with a voltage boost of almost 2 to 1 while the ACR of the autotransformer 12 may remain as high as about 1.5. Additionally, because the auxiliary rectifier 16 may experience lower RMS current, relative to the main rectifier 14, the auxiliary rectifier 16 may be selected to be a smaller device than that used for the main rectifier 14. Thus, overall weight and size of the converter 10 may remain desirable small.

Figure 4:
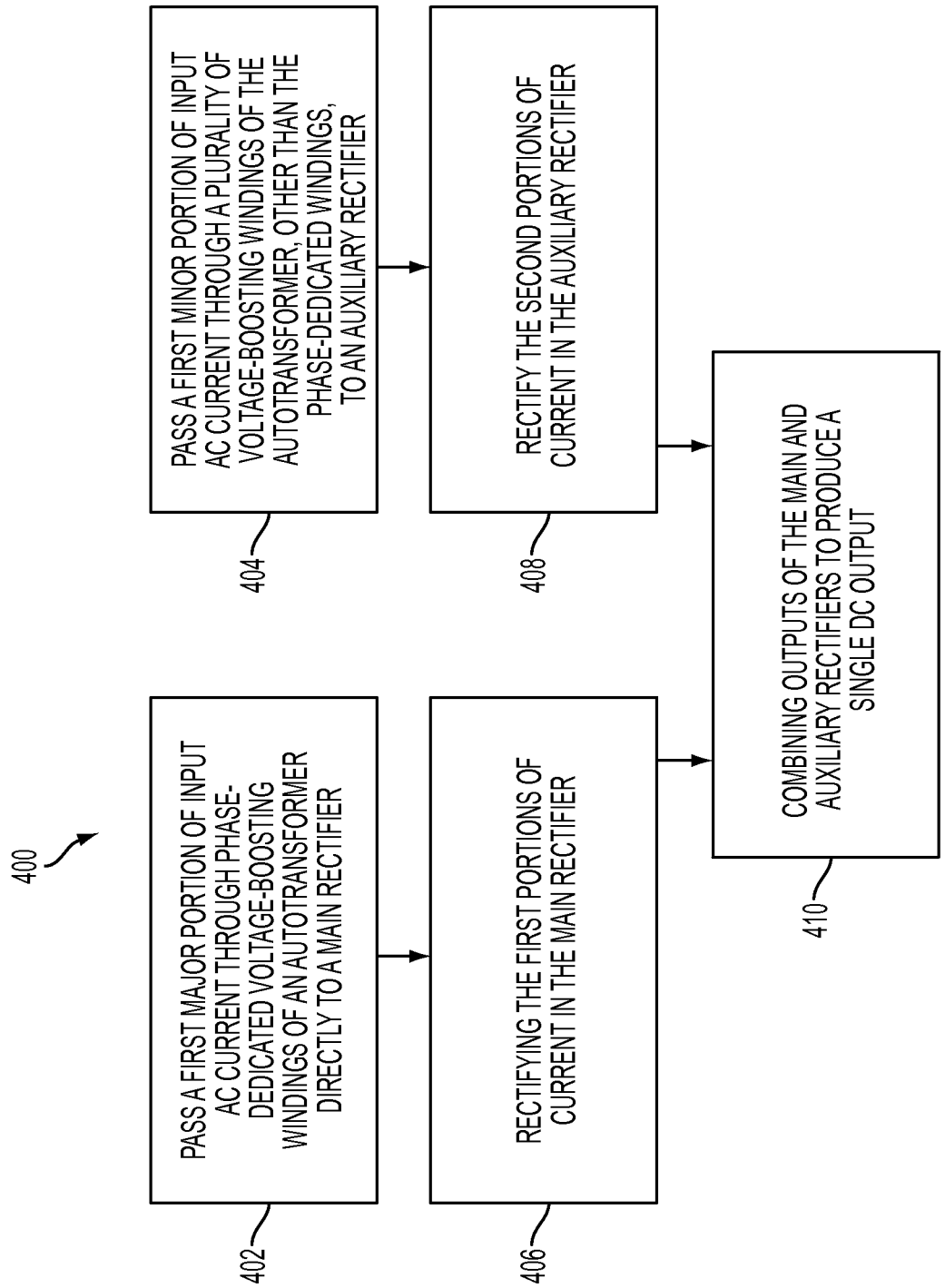
FIG. 4 is a flowchart of a method for performing AC-to-DC power conversion in accordance with an embodiment of the invention.

Referring now to FIG. 4, flowchart 400 illustrates a method for performing AC-to-DC power conversion with a voltage boost In a step 402, a first portion AC power may be passed through phase-dedicated windings of an autotransformer directly to a main rectifier with voltage of the first portion of AC current boosted. For example, AC power may be passed through the windings XA, YA and ZA from the AC power source 18 into the main rectifier 14. In a step 404, a second portion of AC power may be passed through a plurality of windings of the autotransformer, other than the phase-dedicated windings, to an auxiliary rectifier with voltage of second portion of AC power boosted. For example, AC power may be passed from the AC power source 18 through the series connected windings shown in FIG. 3 to the auxiliary rectifier 16. In step 406 and 408, the first and second portions of power may be rectified in the main and the auxiliary rectifiers respectively. In a step 410, outputs of the main and auxiliary rectifiers may be combined to produce a single DC output.

It should be understood, of course, that the foregoing relates to exemplary embodiments of the invention and that modifications may be made without departing from the spirit and scope of the invention as set forth in the following claims.

We claim:

1. A multi-phase AC-to-DC converter comprising:
  a main rectifier; an auxiliary rectifier;
  and an autotransformer connected to the main rectifier and the auxiliary rectifier,
  wherein phase-dedicated windings of an autotransformer form a first current path having a first impedance for a first portion of AC power directly to the main rectifier with voltage of the first portion of AC power boosted;
  wherein a plurality of windings of the autotransformer, other than the phase-dedicated windings, form a second current path having a second impedance, greater than the first impedance for a second portion of AC power, smaller than the first portion, to the auxiliary rectifier with voltage of the second portion of AC power boosted; and
  wherein outputs of the main and auxiliary rectifiers are combined to form a single DC output.

2. The AC-to-DC converter of claim 1:
  wherein power input to the converter is three-phase AC power; and
  wherein a plurality of windings of at least one leg have equal turns ratios and one of the windings of the at least one leg has a turns ratio that is between about 70% and about 75% of the turns ratio of the other windings of the respective leg.

3. The AC-to-DC converter of claim 2:
  wherein the turns ratios of the windings are determined through use of a vector diagram constructed using line-to-line voltage vectors connecting tips positioned on projections of sides of an equilateral triangle:
  wherein a constructor arc is swung between the tips with a radius equal to a length of the line-to-line voltage vector; and wherein the length of the line-to-line voltage vector is selected so that are a resultant number of four of the windings in each of the legs of the autotransformer.

4. The AC-to-DC converter of claim 1, wherein the autotransformer provides a voltage boost of about 2 to 1 and the autotransformer has an autotransformer conversion ratio (ACR) of about 1.5.

5. A method for performing three phase AC-to-DC power conversion with a voltage boost comprising the steps of:
  passing a first portion of AC power along a first current path having a first impedance through phase-dedicated windings of an autotransformer directly to a main rectifier with voltage of the first portion of power boosted;
  passing a second portion of AC power a long a second current path having a second impedance, greater than the first impedance, through a plurality of windings of the autotransformer, other than the phase-dedicated windings, to an auxiliary rectifier so that voltage of the second portion of power is boosted;
  rectifying the first portion of power using the main rectifier;
  rectifying the second portion of power using the auxiliary rectifier, the second portion of power being smaller than the first portion of power; and
  combining outputs of the main and auxiliary rectifiers to produce a single rectified DC output.

6. The method of claim 5 wherein the second portion of AC current is passed through nine windings of the autotransformer.

7. The method of claim 6 wherein the nine windings are connected together in series.

8. The method of claim 7 wherein six of the nine windings have equal turns ratios and three of the nine winding have turns ratios equal to between about 70% to about 75% of the turns ratios of said six windings.

9. The method of claim 5 wherein AC voltage is boosted in the autotransformer by a factor of about 2 to 1.

10. The method of claim 9 wherein the autotransformer maintains an ACR of about 1.5 while the AC voltage is boosted.

* * * * *